(12) United States Patent
Balaji et al.

(10) Patent No.: US 9,616,540 B2
(45) Date of Patent: Apr. 11, 2017

(54) SYSTEM AND METHOD FOR DISPENSING A MINIMUM QUANTITY OF CUTTING FLUID

(75) Inventors: Alagar Krishnan Balaji, Salt Lake City, UT (US); Venugopal Raghavendra Ghatikar, Salt Lake City, UT (US)

(73) Assignee: The University of Utah Research Foundation, Salt Lake City, UT (US)

(*) Notice: Subject to any disclaimer, the term of this patent is extended or adjusted under 35 U.S.C. 154(b) by 606 days.

(21) Appl. No.: 13/984,269

(22) PCT Filed: Feb. 8, 2012

(86) PCT No.: PCT/US2012/024278
§ 371 (c)(1),
(2), (4) Date: Mar. 24, 2014

(87) PCT Pub. No.: WO2012/109320
PCT Pub. Date: Aug. 16, 2012

(65) Prior Publication Data
US 2014/0196273 A1    Jul. 17, 2014

Related U.S. Application Data

(60) Provisional application No. 61/440,852, filed on Feb. 8, 2011.

(51) Int. Cl.
*B23Q 11/10* (2006.01)
*B23Q 17/00* (2006.01)

(52) U.S. Cl.
CPC .......... *B23Q 11/10* (2013.01); *B23Q 11/1046* (2013.01); *B23Q 17/00* (2013.01); *Y10T 29/49995* (2015.01)

(58) Field of Classification Search
CPC .... B23Q 11/10; B23Q 17/00; B23Q 11/1046; Y10T 29/49995
See application file for complete search history.

(56) References Cited

U.S. PATENT DOCUMENTS 3,066,578 A    12/1962    Olton
3,678,631 A    7/1972    Payne et al.
(Continued)

FOREIGN PATENT DOCUMENTS

CA    2316603    11/2005
CA    2504752    8/2009
(Continued)

OTHER PUBLICATIONS

"Design of Minimum Quantity Cutting Fluid Dispensing System for Sustainable Machining" by Ghatikar, Dec. 2012, pp. 1-67.*
(Continued)

*Primary Examiner* — Ramesh Patel
(74) *Attorney, Agent, or Firm* — Workman Nydegger

(57) ABSTRACT

Devices, systems, and methods are provided for controlling a quantity of cutting fluid dispensed for a cutting tool within a CNC or other machining system. The devices, systems, and methods may include controlling multiple fluids such that coolant, lubricant, or other fluids can be delivered at different locations, at different flow rates, have their flow rates changed independently, and/or have their flow rates changed dynamically during a machining operation. In some embodiments, a feedback loop or input may be provided to obtain and/or provide information regarding the machining operation—such as cutting force, cutting temperature, cutting friction, machining operation, tool in use, work piece geometry, and/or material—and automatically and/or independently modify the fluid flow rates. The fluid may be atomized with air or other gases to minimize the quantities of fluid used. Components in the system may be modular to allow the system to be used with existing and new machining technologies.

29 Claims, 7 Drawing Sheets

(56) References Cited

U.S. PATENT DOCUMENTS

| | | | |
|---|---|---|---|
| 4,076,442 A | 2/1978 | Cox, Jr. et al. | |
| 4,105,093 A | 8/1978 | Dickinson | |
| 4,408,280 A * | 10/1983 | Bedini | G05B 19/4163 |
| | | | 318/571 |
| 4,414,456 A * | 11/1983 | Inoue | B23H 7/101 |
| | | | 204/206 |
| 4,418,263 A * | 11/1983 | Inoue | B23H 7/10 |
| | | | 219/69.12 |
| 4,441,245 A * | 4/1984 | Thornton | B23B 39/161 |
| | | | 29/564 |
| 4,442,333 A * | 4/1984 | Inoue | B23H 7/04 |
| | | | 219/69.12 |
| 4,445,168 A | 4/1984 | Petryszyn | |
| 4,461,951 A * | 7/1984 | Luoma, II | G05D 23/2401 |
| | | | 219/241 |
| 4,514,149 A | 4/1985 | Kanebako et al. | |
| 4,527,661 A * | 7/1985 | Johnstone | B23Q 11/121 |
| | | | 184/6.1 |
| 5,050,532 A | 9/1991 | Ruppert | |
| 5,182,720 A | 1/1993 | Beck | |
| 5,213,453 A | 5/1993 | Eriksson | |
| 5,542,498 A | 8/1996 | Boelkins | |
| 5,551,324 A | 9/1996 | Akhmetzyanov et al. | |
| 5,669,743 A | 9/1997 | Johnson et al. | |
| 5,676,506 A | 10/1997 | Sugata | |
| 5,951,216 A * | 9/1999 | Antoun | B23Q 11/1038 |
| | | | 405/61 |
| 6,012,903 A | 1/2000 | Boelkins | |
| 6,425,715 B1 | 7/2002 | Sasanecki | |
| 6,567,710 B1 | 5/2003 | Boelkins | |
| 6,582,167 B1 | 6/2003 | Sugata et al. | |
| 6,702,199 B1 | 3/2004 | Sugata et al. | |
| 6,783,309 B2 * | 8/2004 | Makiyama | B23Q 11/1038 |
| | | | 184/6.14 |
| 6,834,843 B2 * | 12/2004 | Liao | F16K 31/402 |
| | | | 251/129.04 |
| 6,923,604 B2 | 8/2005 | Sugata et al. | |
| 6,926,478 B2 | 8/2005 | Sugata et al. | |
| 6,938,633 B2 * | 9/2005 | Sugata | B23Q 39/023 |
| | | | 137/1 |
| 6,981,825 B2 | 1/2006 | Sugata et al. | |
| 7,048,481 B2 | 5/2006 | Sugata et al. | |
| 7,665,578 B2 | 2/2010 | Grozinger | |
| 2005/0182525 A1 * | 8/2005 | Laverdiere | G05D 7/0635 |
| | | | 700/282 |
| 2006/0049000 A1 | 3/2006 | Boelkins et al. | |
| 2006/0053026 A1 | 3/2006 | Boelkins | |
| 2010/0130106 A1 * | 5/2010 | Hyatt | B24B 5/02 |
| | | | 451/53 |
| 2010/0204072 A1 | 8/2010 | Kwon et al. | |
| 2012/0021676 A1 * | 1/2012 | Schubert | B24C 1/045 |
| | | | 451/38 |

FOREIGN PATENT DOCUMENTS

| | | |
|---|---|---|
| CN | 1115228 | 7/2003 |
| CN | 1116148 | 7/2003 |
| DE | 3702216 | 10/1987 |
| DE | 102005013458 | 11/2005 |
| EP | 0520772 | 6/1993 |
| EP | 1211019 | 7/2003 |
| EP | 1172173 | 8/2003 |
| EP | 1511595 | 3/2005 |
| EP | 1588798 | 1/2007 |
| EP | 1797366 | 6/2007 |
| ES | 2248320 | 3/2006 |
| JP | 2000126984 | 5/2000 |
| JP | 2003311582 | 11/2003 |
| JP | 3861235 | 12/2006 |
| WO | 0031309 | 6/2000 |
| WO | 0189762 | 11/2001 |
| WO | 02064311 | 8/2002 |
| WO | 03013786 | 2/2003 |
| WO | 2006029063 | 3/2006 |
| WO | 2006029063 | 8/2006 |
| WO | 2012109320 | 8/2012 |

OTHER PUBLICATIONS

T. Aoyama, et al., "Development of a new lean lubrication system for near dry machining process", CIRP Annals—Manufacturing Technology, 2008, 125-128, 57, ScienceDirect, Elsevier.

Weiwu Zhong, et al., "Adaptive Fuzzy Control of Cutting Temperature Based on Cutting Fluid in High-Speed Machining", Advanced Materials Research, 2010, 2381-2386, vols. 97-101, Trans Tech Publications, Switzerland.

Patent Cooperation Treaty, International Search Report and Written Opinion, PCT/US2012/024278, May 25, 2012.

Aoyama, T., "Development of a Mixture Supply System for Machining with Minimal Quantity Lubrication" *CIRP Annals-Manufacturing Technology* 2002.

Yamashita, M., et al., "Development of a New Cutting Fluid Supply System for Near Dry Machining Process" *Key Engineering* 2009.

Jun, M.B.G., et al., "An Experimental Evaluation of an Atomization-Based Cutting Fluid Application System for Micromachining" *Journal of Manufacturing* 2008.

International Search Report for PCT/US2005/031502 dated Jun. 13, 2006.

* cited by examiner

SYSTEM AND METHOD FOR DISPENSING A MINIMUM QUANTITY OF CUTTING FLUID

CROSS-REFERENCE TO RELATED APPLICATIONS

The present application claims the benefit of and priority to PCT Patent Application Ser. No. PCT/US2012/024278, filed Feb. 8, 2012, entitled "SYSTEM AND METHOD FOR DISPENSING A MINIMUM QUANTITY OF CUTTING FLUID", which claims the benefit of and priority to U.S. Provisional Patent Application Ser. No. 61/440,852, filed Feb. 8, 2011, entitled "SYSTEM AND METHOD FOR DISPENSING A MINIMUM QUANTITY OF CUTTING FLUID", which are incorporated herein by reference in their entirety.

FIELD OF THE INVENTION

The present disclosure relates generally to machining processes. More particularly, the present disclosure relates to systems and methods for controlling delivery of cutting fluid, coolant, lubricant, air, or any combination of the foregoing, to performing a machining operation. More particularly still, the present disclosure relates to a system providing real time, dynamic, and independent control of flow of a combination of one or more of cutting fluid, coolant, lubricant, air, and/or other gases.

BACKGROUND OF THE INVENTION

The modern manufacturing industry relies heavily on computer numerical controlled (CNC) machining tools and operations, particularly in the fabrication of metal components. An integral part of such machining processes is the use of cutting fluids. In particular, dating at least back to the work of F. W. Taylor in 1907, it was identified that if a fluid is applied to a cutting tool during a machining operation, the tool life can be increased, even if the fluid is water. Significant research has been conducted since that time to identify particular chemical compounds—including oils—that further the goal of increased tool life. Moreover, such research has expanded beyond the mere goal of improved tool life as the use and formulations of cutting fluids are also impacted by goals of obtaining higher quality surface finishes and reducing required cutting forces.

In a typical arrangement, a traditional CNC process applies cutting fluids using a flood application. In particular, a cutting fluid system within a CNC machining center applies a heavy and continuous jet or stream of cutting fluid to a cutting zone. The applied cutting fluid can facilitate cooling and/or lubrication of the cutting tools, and can also facilitate removal of chips of the cut-away materials. For instance, the cutting fluid may exit the cutting zone and carry the machined chips under gravity flow and into a chute where the chips can be filtered from at least some of the cutting fluid.

While a flood application of cutting fluid may generally be considered as facilitating the obtaining of desired results in terms of tool cooling and lubrication, obtaining those results can come at a significant cost. Such costs may be direct as well as indirect. For instance, resulting from the continuous stream of cutting fluid during machining, enormous quantities of cutting fluids can be consumed. Indeed, in some cases, cutting fluids may flow at a rate of over five liters per minute. Even where some of the cutting fluids can be cleaned and recovered for recycled use, a cutting fluid system used with a CNC machine may consume a large amount of cutting fluids. The cutting fluids carry with them direct costs not only in terms of the amount required to buy the fluid, but also the cost associated with storage and handling the cutting fluid. A machine shop may need to store large amounts of cutting fluid on the shop floor for all the manufacturing operations, thereby consuming valuable floor space. Used cutting fluids are also collected from the machines for recycling or disposal, and the reservoirs storing the reusable or disposable fluid also consumes floor space.

Additional costs may be incurred as a result of the handling processes used in connection with cutting fluids. Cutting fluids may contain hazardous wastes, so specific procedures may be implemented to handle the cutting fluids. Additionally, material chips may be recycled; however, because they can be covered in cutting fluids, specialized or costly equipment may be required to remove the cutting fluids, including residues or byproducts, from the chips and then to dry the chips that are fit for recycling.

On a global level, there is a groundswell of support for environmentally benign manufacturing processes. For metal machining manufacturing, the extreme consumption of cutting fluids, as well as the hazardous nature of some cutting fluids or cutting fluid components places such processes outside the realm of environmentally benign or sustainable processes. For instance, cutting fluids can pose environmental and economic risks as a result of toxic mist generation, liquid waste disposal, reduced recyclability of chips, and high maintenance costs.

Research into bringing metal machining into alignment with environmental and sustainability initiatives has result in some additional options for machine shops. For instance, one option is known as minimum quantity lubrication (MQL) which uses small amounts of lubricant in an atomized spray. Such a process greatly reduces the amount of fluid used; however, the process may primarily provide lubrication while being less effective in providing cooling to the cutting tool and/or work material. Due to reduced cooling, there may be thermal build-up that results in increased tool-wear, thermal distortion of work parts, and other less than desirable effects.

Other research has been conducted by advocates of "dry" or "near-dry" machining. Other efforts have been made to develop biodegradable cutting fluids. However, even biodegradable cutting fluids are not totally safe as they may become mixed with machine oils, grease and lubricants used in machining.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

Example embodiments within the present disclosure relate to devices, systems, and methods for reducing and possibly minimizing the usage of cutting fluids while still obtaining desired tool wear, surface finish, surface integrity, cutting force, cutting temperature, or frictional characteristics. Additional example embodiments of the present disclosure may relate to systems, devices, and methods for controlling the quantity of fluid used. Such control is optionally dynamic based on any of a variety of parameters (e.g., type of work material, type of machining operation, cutting tool, cutting force, etc.). Still other example embodiments may relate to systems, devices, and methods that employ the use of multiple fluids, any or all of which may be independently and dynamically controlled.

In an embodiment, a cutting fluid dispensing system may include a fluid reservoir, and a fluid transport control system hydraulically linked to the fluid reservoir. The fluid transport control system may be configured to retrieve a fluid from the fluid reservoir. The system may also include an air source and an air transport control system pneumatically linked to the air source. The air transport control system may be configured to receive air from the air source. The system may also include a processing component configured to dynamically control at least one of air flow conditions using the air transport control system or fluid flow conditions using the fluid transport control system during a machining operation.

In an embodiment, a minimum quantity cutting fluid (MQCF) dispensing system may include a first fluid reservoir and a first pump hydraulically configured to retrieve a first fluid from the first fluid reservoir. The system may also include a second fluid reservoir and a second pump hydraulically configured to retrieve a second fluid from the second fluid reservoir. The system may also include a processing component communicatively coupled to the first pump and the second pump, wherein the processing component is configured to transmit a first signal to the first pump and a second signal to the second pump. The first and second signals may be dynamically and independently changeable by the processing component. The system may also include an air compressor and a valve pneumatically configured to receive air from the air compressor. The processing component may be communicatively coupled to the valve and configured to transmit a third signal to the valve. The third signal may be dynamically and independently changeable, relative to the first and second signals by the processing components. The system may also include one or more input devices configured to obtain information including measurable data relative to a work piece in production within a cutting machine or data regarding a tool or process performed by the cutting machine. The one or more input devices may be configured to communicate the obtained information to the processing component.

In another embodiment, a minimum quantity cutting fluid (MQCF) dispensing system may include at least two reservoirs containing different liquids. The system may also include at least two pumps, each of the two pumps may have an input that is hydraulically connected to a respective one of the two reservoirs. Each of the two pumps may also have a hydraulic output and may be configured to change a flow rate at the hydraulic output in response to a received analog voltage signal. The system may also include an air compressor and a voltage-to-pneumatic transducer having an input pneumatically connected to the air compressor. The voltage-to-pneumatic transducer may include a pneumatic output and may be configured to change an air pressure pneumatic output in response to a received analog voltage signal. The system may also include a combined air filter, drain, and pressure gage interposing between the air compressor and the voltage-to-pneumatic transducer. The system may also include a junction linked to each of the hydraulic outputs of the two pumps and the pneumatic output of the voltage-to-pneumatic transducer. The junction may include an output configured to place hydraulic lines corresponding to the hydraulic outputs coaxial to, and within, a pneumatic line corresponding to the pneumatic output. The system may also include a nozzle configured to receive the hydraulic lines and the pneumatic line and combine the same into a single directed at a cutting tool of a CNC machining system. The system may also include a control system that includes a CPU configured to produce one or more digital signals. The control system may also include a digital-to-analog converter configured to receive the digital signals and transform the digital signals into at least three analog voltage signals. The control system may also include a signal filter configured to receive the three analog voltage signals and direct a first analog voltage signal to the voltage-pneumatic transducer. The control system may also include at least two controllers. Each of the controllers may be configured to receive one of other analog voltage signals and transform the received voltage signal into a signal understandable by a corresponding one of the pumps. The control system may also include a digital input configured to determine a value representative of a cutting force at the cutting tool and transmit the value to the CPU. The control system may also include an analog-to-digital converter configured to receive the value and convert the value to a digital signal. The CPU may include logic that includes instructions on how to modify each of the flow rates and the air pressure automatically, without user intervention, and dynamically in response to the cutting force at the cutting tool.

In another embodiment, a method for machining a work piece may include beginning a machining operation with a CNC machining system. The method may also include initiating a flow of at least two of a lubricant, a coolant, or air through a transport control system directed at a cutting tool of the CNC machining system. The method may also include evaluating a machining parameter of the machining operation and determining that the machining parameter has changed. In response to determining that the machining parameter has changed, the method may include dynamically and without user intervention changing two or more of a lubricant flow rate, a coolant flow rate, or an air pressure.

Additional features and advantages of example embodiments will be set forth in the description which follows, and in part will be obvious from the description, or may be learned by the practice of the invention. The features and advantages of the embodiments herein may be realized and obtained by means of the instruments and combinations particularly pointed out in the appended claims. These and other features of the present disclosure will become more fully apparent from the following description and appended claims, or may be learned by the practice of the invention as set forth hereinafter.

BRIEF DESCRIPTION OF THE DRAWINGS

Features and advantages of the embodiments of this disclosure will be apparent from the detailed description that follows, and which taken in conjunction with the accompanying drawings and attachments together illustrate and describe exemplary features of the disclosure herein. It is understood that these drawings merely depict exemplary embodiments and are not, therefore, to be considered limiting of its scope. Additionally, the drawings are generally drawn to scale for some example embodiments; however, it should be understood that the scale may be varied and the illustrated embodiments are not necessarily drawn to scale for all embodiments encompassed herein.

Furthermore, it will be readily appreciated that the components of the illustrative embodiments, as generally described and illustrated in the figures herein, could be arranged and designed in a wide variety of different configurations, and that components within some figures are interchangeable with, or may supplement, features and components illustrated in other figures. Nonetheless, various particular embodiments of this disclosure will be described and explained with additional specificity and detail through the use of the accompanying drawings, in which.

DETAILED DESCRIPTION

The embodiments described herein generally extend to devices, systems, and methods for minimizing cutting fluid applied to a cutting zone in a machining operation. In some embodiments, one or more liquid or gaseous fluids can be applied to a cutting zone at a variable flow rate or pressure. The flow rate or pressure may be dynamically determined and/or controlled based on various parameters of the machining operation, and each of the one or more fluids can flow at a rate that is independent of other fluids. In other embodiments, the flow rate or pressure may be dynamically determined and/or controlled based on manual user inputs, automated inputs, or the like.

Figure 1:
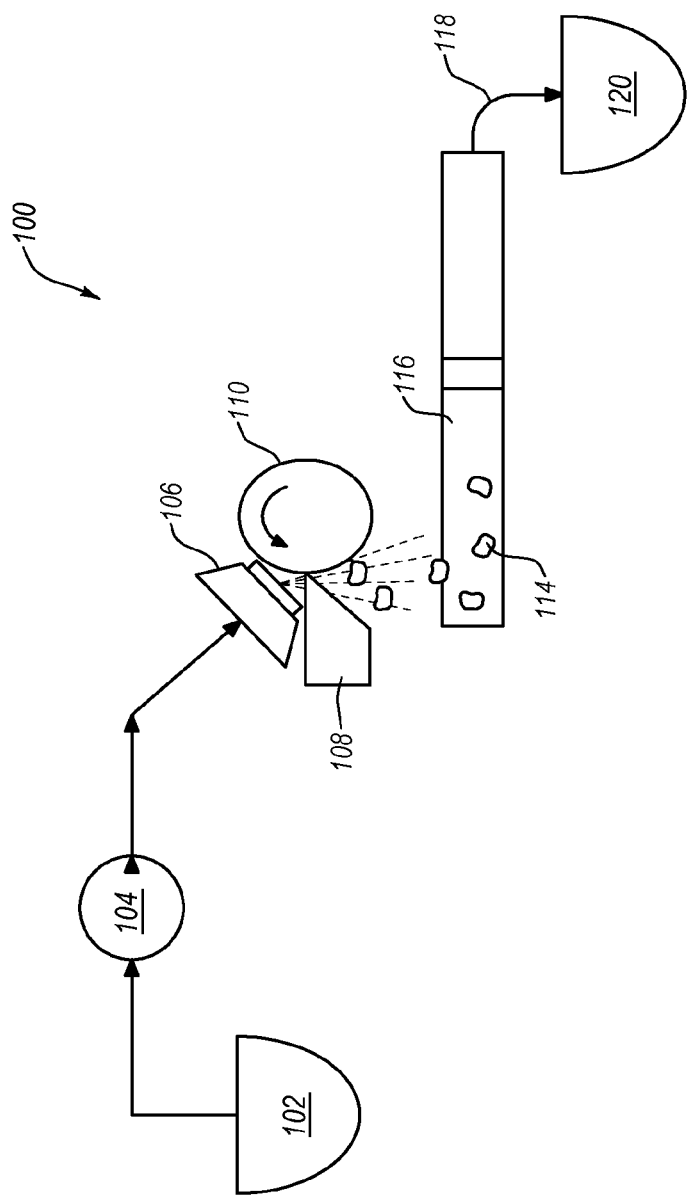
FIG. 1 schematically illustrates an exemplary cutting fluid dispensing system according to one exemplary embodiment of the present disclosure.

FIG. 1 schematically illustrates a cutting fluid dispensing system according to an exemplary embodiment of the present disclosure. In FIG. 1, a cutting fluid dispensing system 100 may include access to a fluid reservoir 102. Cutting fluid within the fluid reservoir 102 may be pumped to a work piece 110. Cutting fluid may include coolants, lubricants, oils, water, oil-water emulsions, paste, gels, combinations thereof, or other suitable fluids. In this embodiment, a pump 104 is used for this process. More particularly, the pump 104 is in fluid communication with the fluid in the fluid reservoir 102. As the pump 104 is activated, fluid moves from the fluid reservoir 102 and towards a nozzle 106 that is directed at the cutting zone. In particular, the nozzle 106 is directed generally towards the work piece 110, a cutting tool 108 that is performing a machining operation on the work piece 110, or at an interface between the cutting tool 108 and the work piece 110.

The fluid may lubricate and/or cool the cutting tool 108 during the machining operation. As a result, application of the fluid may prolong the life of the cutting tool 108, reduce cutting forces, or improve surface finish characteristics of the cut work piece 110. To perform such a function, the fluid may be applied in a jet or stream and at a relatively high flow volume. For instance, the fluid may be applied between a rate of one to five liters per minute, although the rate may at times be larger or smaller. For instance, the flow rate may exceed five liters per minute, or may be less than one liter per minute. By way of illustration, the flow rate may be between one hundred cubic centimeters per minute and one liter per minute.

As the work piece 110 is cut or otherwise machined by the cutting tool 108, portions of the work piece 110 may be removed. Such portions are illustrated in FIG. 1 as chips 114. In the illustrated system, the chips 114 are acted upon by gravity, and fall away from the work piece 110. In some cases, the chips 114 may be made of a material that can be recycled or reused in some manner. Accordingly, as shown in FIG. 1, the chips 114 may be gravity or otherwise fed towards a filter 116. The filter 116 may be used to filter chips 114 for recycling or reuse, or to filter the chips 114 out of excess cutting fluid 118 so that the excess cutting fluid 118 can be reused.

More particularly, due to the flow rate of the cutting fluid, the chips 114 may be covered in cutting fluid as they are directed towards the filter 116. To reuse the chips 114 or the cutting fluid, the chips 114 and cutting fluid may be separated. The filter 116 thus provides this feature. As the cutting fluid passes through the filter 116, the chips 114 may be removed and the excess cutting fluid 118 may be directed, potentially as reusable cutting fluid, into a reservoir 120. The reservoir 120 may store the reusable cutting fluid until it is needed, or may feed back into the fluid reservoir 102 to form a substantially closed fluid circuit.

Figure 2:
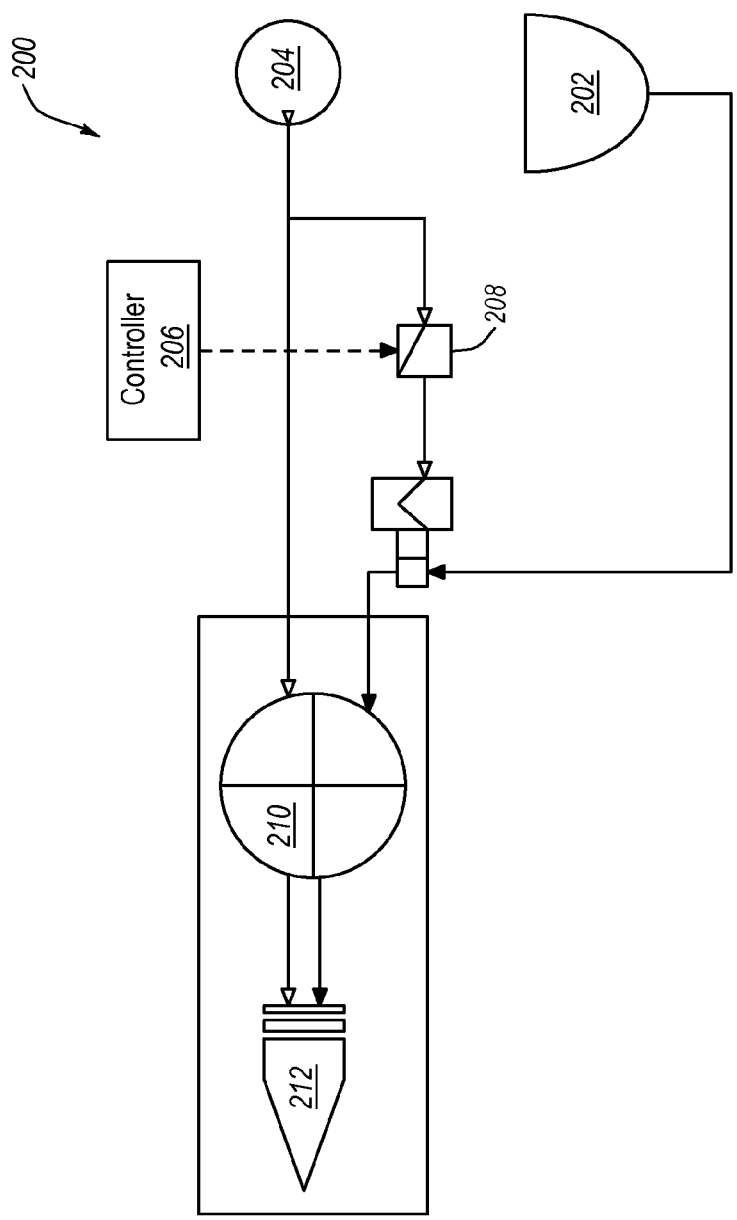
FIG. 2 schematically illustrates an exemplary cutting fluid dispensing system according to another exemplary embodiment of the present disclosure.

FIG. 2 schematically illustrates an exemplary cutting fluid dispensing system according to another exemplary embodiment of the present disclosure. A cutting fluid dispensing system 200 may deliver a cutting fluid or lubricant along with a carrier gas into a spindle while a mixing device 212 generates the oil-mist that is delivered to a tool tip (not shown). In one embodiment, the mixing device 212 may be a nozzle. As shown in FIG. 2, the system 200 may also include a fluid reservoir 202. The fluid reservoir 202 may contain the lubricant that ultimately will be applied to the tool tip. In this embodiment, an air source 204 may also be provided. The air source 204 may, for instance, include a compressor, a container, a pressurized vessel, a tank, an accumulator, or other suitable component that can store and provide air to the system 200.

A controller 206 may be integrated with the system 200. The controller 206 can be used to regulate the supply of lubricant that is provided to the mixing device 212. The controller 206 may also, for instance, control a timer 208 that assists in delivering a desired amount of air to the mixing device 212. The controller 206 can control air and lubricant flow such that the cutting fluid flows at about five hundred millimeters an hour. The air and lubricant can pass through a multi-channel rotary joint 210 and from there be directed into the mixing device 212. Although not illustrated, the system 200 may also address chip transport. For instance, the system 200 may include a gravity feed that uses gravity to cause the chips to fall from machining and clear the cutting zone. Alternatively, a shrouded tool holder method may be employed to have a vacuum suck chips away from the cutting zone and transport them to a location outside of the system 200.

Figure 3:
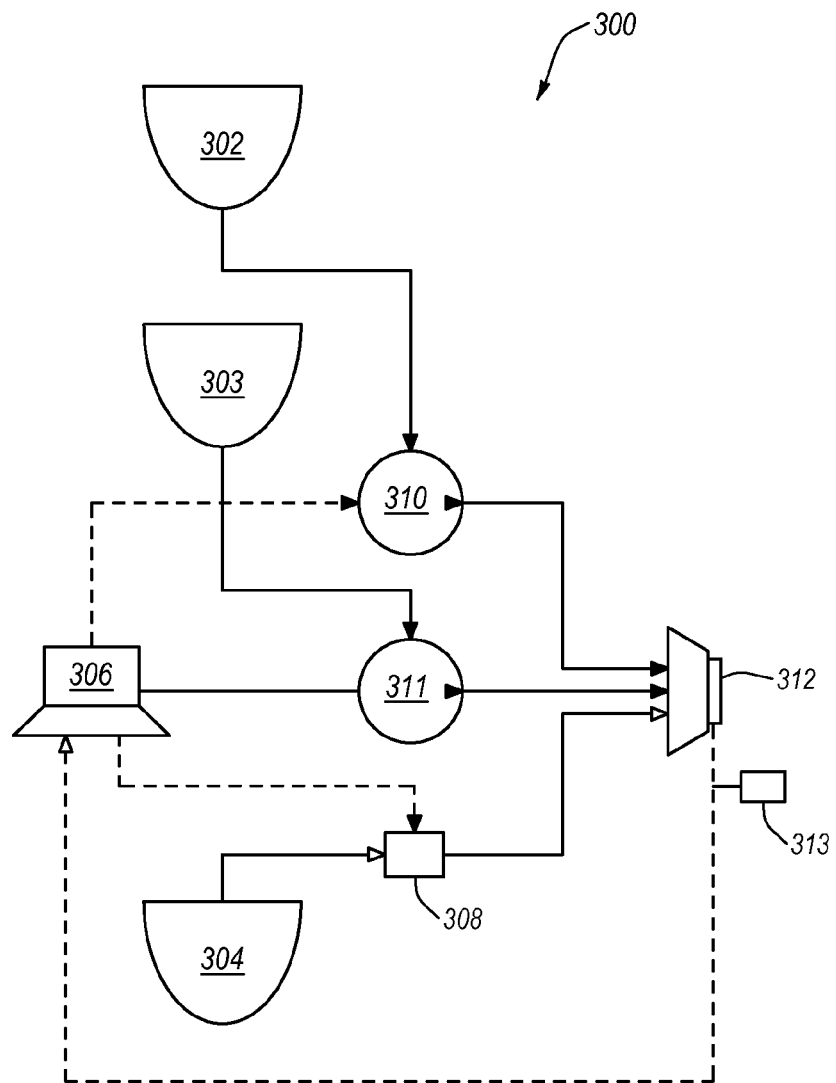
FIG. 3 schematically illustrates an exemplary cutting fluid dispensing system according to yet another exemplary embodiment of the present disclosure.

FIG. 3 schematically illustrates an exemplary cutting fluid dispensing system according to yet another exemplary embodiment of the present disclosure. In particular, the illustrated embodiment schematically shows a cutting fluid dispensing system 300 that may be used to supply cutting fluids to a cutting zone. The cutting fluids may include lubricants, coolants, oils, water, oil-water emulsions, paste, gels, combinations thereof, or other suitable cutting fluids. In one embodiment, the system 300 may be a minimum quantity cutting fluid ("MQCF") dispensing system. Furthermore, in some embodiments, the amounts of cutting fluids may be dynamically controlled, independent of each other, such that as machining parameters of a cutting machine change, the system 300 can automatically adjust the flow of fluids to account for such changes.

In FIG. 3, the system 300 may include two fluid reservoirs 302, 303. The fluid reservoirs 302, 303 may contain different fluids. For instance, in one embodiment, one of the reservoirs 302, 303 may contain a coolant while the other may contain a lubricant. In other embodiments, however, both reservoirs 302, 303 may contain coolants or both may contain lubricants. For instance, different types of lubricant or coolant may be preferred for certain cutting operations, tools, or work piece materials. Thus, based on these parameters, different fluids, or different quantities of fluids, may be applied. In other embodiments, the system may include three, four, five, six, or another suitable number of reservoirs containing the same or different fluids.

The fluid reservoirs 302, 303 may each be in fluid communication with a transport control system or a fluid transport control system. In the illustrated embodiment, for instance, fluid in the fluid reservoir 302 may be moved by using a pump 310, while a separate pump 311 may be used to move the fluid in the second fluid reservoir 303. The pumps 310, 311 may have any of a number of different constructions. For instance, in one embodiment, the pumps 310, 311 may be fixed, positive displacement pumps, although the pumps 310, 311 may also be variable displacement pumps or micropumps. The pumps 310, 311 may also be fluid mixing pumps or venturi systems in still other embodiments. According to some aspects, the pumps 310, 311 may be metering pumps that can, for instance, vary the flow rate based on an input such that a wide range of flow types can be provided, the flow types ranging from droplets to aerosol flow. For instance, where the pumps 310, 311 are electric pumps, the flow rate may be varied based on the current or voltage supplied to the respective pump 310, 311. In other embodiments, the system 300 may include one, three, five, or any other suitable number of pumps or other suitable types of fluid movement devices.

In an embodiment, the pumps 310, 311 may be communicatively linked to a processing component 306. The processing component 306 may, for instance, be a computing device, a microprocessor, a dedicated hardware controller, a programmable logic controller (PLC), a CNC controller or sensor, combinations thereof, or any other suitable processing component. In one embodiment, the processing component 306 may vary the input to the pumps 310, 311. For instance, as noted previously, the pumps 310, 311 can be electric pumps that adjust the flow rate based on a supplied current or voltage. According to one embodiment, the processing component 306 may supply a current or voltage to the pumps 310, 311 and thus control changes in flow rates of the fluids in the respective reservoirs 302, 303. In some embodiments, the processing component 306 may vary inputs to the pumps 310, 311 based on a feedback loop including one or more sensors, input devices, measuring devices, and/or or other suitable devices. In other embodiments, the processing component 306 may be preprogrammed to vary inputs to the pumps 310,311 according to instructions included within software or one or more programs. In yet other embodiments, the processing component may be programmable by a user to vary inputs to the pumps 310, 311 according to user specified instructions.

As illustrated in FIG. 3, communication links between the processing component 306 and the pumps 310, 311 (shown in dashed lines) are separate and independent. As a result, the processing component 306 may also be able to control the pump 310 independent of the pump 311. For instance, the voltage or current supplied to the pump 310 may be increased or decreased by a particular amount, while the current or voltage supplied to the pump 311 may remain unchanged, change in an opposite direction as compared to that of the pump 310, or increase or decrease with pump 310, but by a different amount or percentage.

As fluid flows from the reservoirs 302, 303 as controlled by the pumps 310, 311, the fluid(s) may be directed towards a cutting zone of a cutting machine (not shown). In one embodiment, a nozzle 312 may be directed at the cutting zone. In particular, the nozzle 312 may be directed generally towards a work piece, the cutting tool that is performing a machining operation on the work piece, or at an interface between the cutting tool and the work piece.

The nozzle 312 may be in fluid communication with the pumps 310, 311 such that the fluids pumped therethrough can each reach and be sent through the nozzle 312. At the nozzle, the fluids may irrigate the work piece, and can do so according to any of a variety of different flow rates. For instance, the pumped fluids may be pumped at a high flow rate (e.g. similar to flooding) or at a lower flow rate (e.g., on the order of milliliters per hour). Depending on the flow rate, the nozzle 312 may direct fluid such that it drips into the cutting zone, or is streamed into the cutting zone.

In some embodiments, the nozzle 312 may direct an atomized flow of fluids onto the cutting zone. By way of illustration, FIG. 3 illustrates a container 304. The container 304 may be a compressor, a tank, a vessel, cylinder, and/or other type of source for air and/or other gases (e.g., argon, helium, carbon dioxide, and/or nitrogen). As further shown in FIG. 3, the container 304 may be in communication with an air transport control system including a transducer or a valve 308 that may control the flow conditions (e.g., flow rate, pressure, velocity) of the air and/or other gases as the air and/or other gases exits the container 304 and moves towards the nozzle 312. As with the pumps 310, 311, the processing component 306 may communicate with the valve 308 to selectively and/or dynamically control the air pressure within the lines extending between the valve 308 and the nozzle 312.

In one embodiment, by controlling the air flow rate and/or air pressure at the valve 308, the processing component 306 can control the manner in which the fluids from reservoirs 302, 303 are applied to the cutting zone by the nozzle 312. For instance, the processing component 306 may direct the valve 308 to allow a very low air pressure, or to shut off the supply of air to the nozzle 312 such that the flow may be dictated entirely by the flow rate of the coolant, lubricant, or other fluids. In another embodiment, the valve 308 may be directed to allow higher air pressures to pass towards the nozzle 312 such that the air can, at or near the nozzle 312, be combined into an air and fluid spray in which the air carries the fluid as small droplets within an atomized flow.

From the foregoing, it should be appreciated that the flow and pressure of the various fluids in the system 300 can be widely varied. For example, by shutting off any or all of the pumps 310, 311 and/or valve 308 independently, the system 300 can be used to deliver coolant alone, lubricant alone, air alone, lubricant and air, coolant and air, lubricant and coolant, lubricant and coolant and air, or any combination of multiple lubricants, or coolants.

As also illustrated in FIG. 3, in some embodiments a feedback loop may be used to provide information to the processing component 306 of the system 300. For instance, a feedback loop may be used to provide the processing component 306 with information about the operation of the nozzle 312 or any number of other factors. For instance, the feedback loop may be tied into one or more sensors 313 that directly or indirectly measure the flow rate of a coolant, lubricant, air, gas, or other fluid within the system 300. Based on the measured value, the processing component 306 may adjust the operation of pumps 310, 311 or valve 308 to obtain a desired value. The feedback loop may also include other information. For instance, sensors, a measurement tool, and/or other sensing devices may be placed at the cutting zone to measure the cutting force of a cutting tool or cutting machine. In one embodiment, different fluids or fluid flow conditions (e.g., pressure, velocity, flow rate, volume) may be desired as the cutting force changes. Accordingly, as the processing component 306 may be informed of a change in the cutting force, the processing component 306 may access a database, logic, or some other structure or module to determine a manner in which the flow conditions within the system 300 may be varied. For instance, in an embodiment, the processing component 306 may access a database, the database may be a machining database that may include a factor used by decision making logic implemented by, or accessible to, the processing component 306. The machining database may facilitate a determination of a desired process output for a particular combination of tool and work materials. A desired output may be provided in the database, or parameters or other information may be determined by logic that is predefined in system software, hardware, firmware, or in a combination of the foregoing. Cutting machine and/or cutting fluid machining system performance may also be monitored using sensing devices, and performance determinations may be used to update the database.

In still other embodiments, the processing component 306 may be made aware of changes in tooling, cut types, or material, and base changes to the flow conditions thereon. For instance, if the processing component 306 is made aware that a "parting off" or "deep groove turning" process is being performed by the cutting machine, a higher quantity of coolant may be applied to transport heat generated at a tool-work piece interface. Coolant flow in such operations may be higher when compared to, for instance, operations such as "thread cutting" which have a high priority placed on surface quality and typically are formed with increased lubrication. In still another embodiment, the processing component 306 may communicate or be integral with a controller that controls the machining operations. The controller controlling the machining operations may thus make the processing component 306 aware of the particular code (e.g., G & M code) being used, the tooling or machining process being used, or the like, and the processing component 306 may use that information to direct operation of the pumps 310, 311 and/or valve 308. The processing component 306 may also be used to calculate, or access a determined calculation, of a machining operation type and then synchronize the cutting fluid machining system with operations of the cutting machine.

Figure 4:
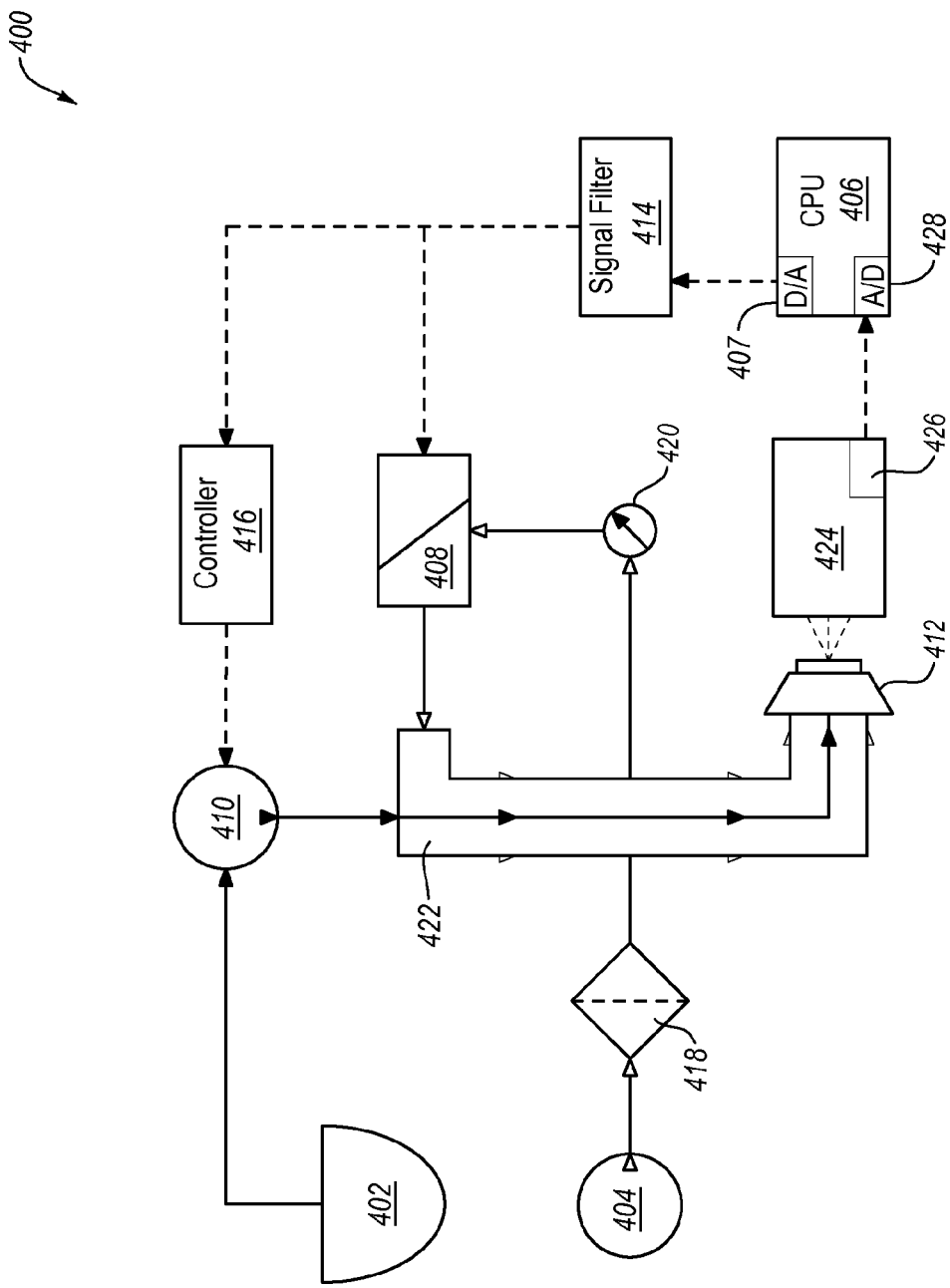
FIG. 4 schematically illustrates an exemplary cutting fluid dispensing system according to a further exemplary embodiment of the present disclosure.
Figure 5:
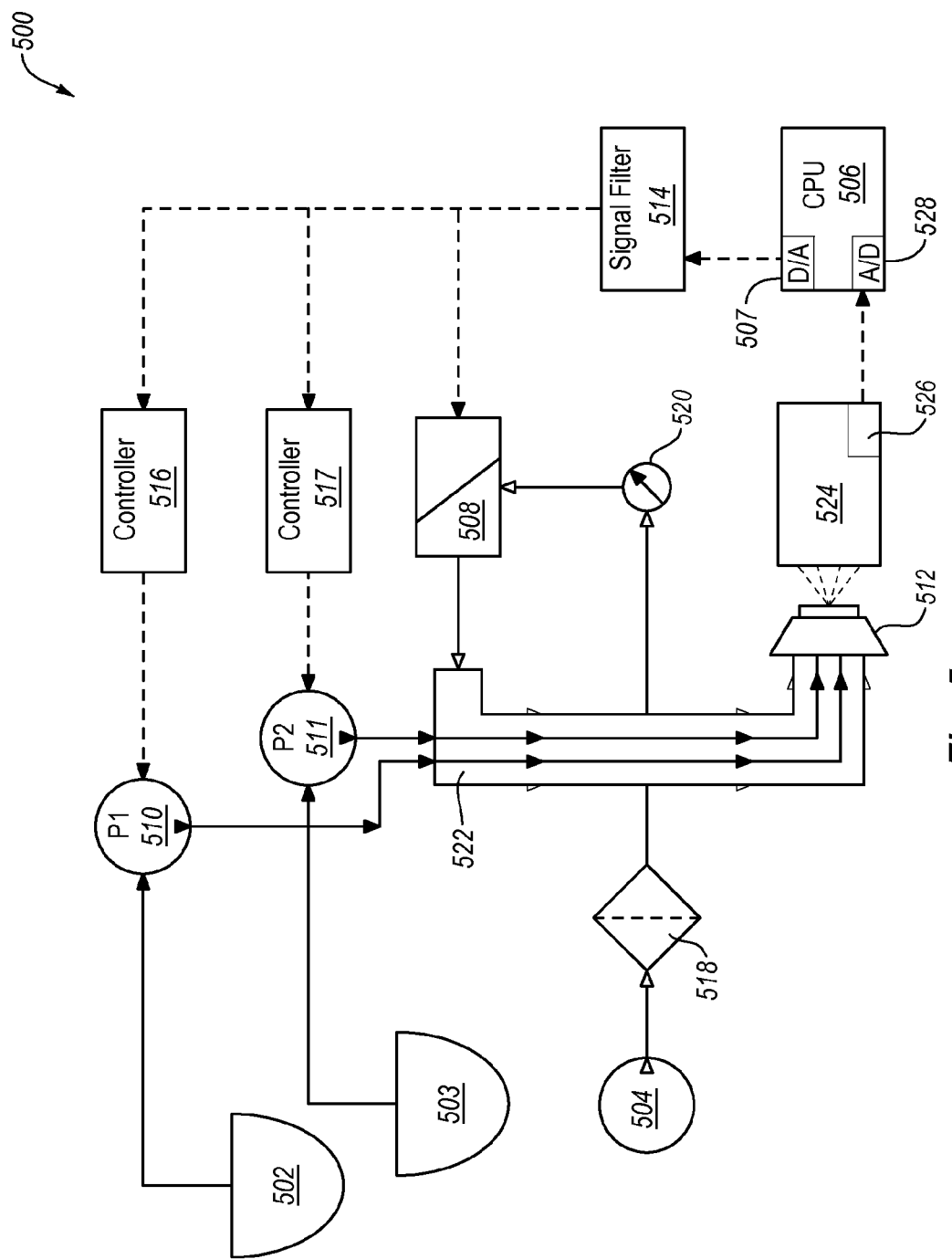
FIG. 5 schematically illustrates an exemplary cutting fluid dispensing system according to an exemplary embodiment of the present disclosure.

Turning now to FIGS. 4 and 5, additional cutting fluid dispensing systems 400, 500 are illustrated with various types of constructions. FIG. 4, for instance, illustrates a system 400 in which air and/or other gases (e.g., argon, helium, and/or nitrogen) may be supplied by an air source 404, and cutting fluid is available from a single fluid reservoir 402. In FIG. 5, however, the system 500 has a supply of air and/or other gases (e.g., argon, helium, and/or nitrogen) using an air source 504, while fluids are available from two separate fluid reservoirs 502, 503. It should be appreciated that these embodiments are merely illustrative, and that other embodiments are contemplated herein. For example, there may be more than two fluid reservoirs. This may be the case where, for instance, different types of coolants and/or lubricants are desirable for different work piece materials, machining operations, tools, and the like.

With reference now to FIG. 4, the cutting fluid dispensing system 400 is shown as including a processing component that may dynamically control operation of a pump 410 and/or a transducer 408. As discussed below, in some embodiments, the processing component may dynamically control operation of the pump 410 and/or the transducer 408 based on a feedback loop including one or more sensors or other input devices. In other embodiments, the processing component may be preprogrammed to dynamically control operation of the pump 410 and/or the transducer 408 according to instructions included within software or one or more programs. In yet other embodiments, the processing component may be programmable by a user to dynamically control operation of the pump 410 and/or the transducer 408 according to user specified instructions. For example, a user may program the processing component to dynamically control operation of the pump 410 based on a pre-specified temperature range of a work piece such that volume and/or flow rate of coolant being dispensed may be modified if the temperature of the work piece is determined to be within or outside the pre-specified temperature range. In one embodiment, the processing component may be a central processing unit ("CPU") 406. In other embodiments, the processing component may, for instance, be a computing device, a microprocessor, a dedicated hardware controller, a programmable logic controller (PLC), a CNC controller or sensor, combinations thereof, or any other suitable processing component.

The transducer 408 may be a type of valve, a sensor/detector, a photonic transducer, a pressure transducer, an electro-mechanical, an electromagnetic transducer, a photovoltaic transducer, an acoustic transducer, a thermal transducer, a chemical transducer, or any other suitable type of transducer. In one embodiment, the transducer 408 may be a pneumatic transducer. The system 400 may have an air transport control system including at least the transducer 408 to control flow conditions of air and/or other gases (e.g., pressure, flow rate, velocity, temperature) within the system 400, and particularly at a nozzle 412. For instance, in one embodiment, the transducer 408 may vary the air pressure allowed to pass through the transducer 408 in response to a received voltage signal. As an analog voltage is applied, for instance, the changes in voltage may result in various allowed air pressures. For instance, the transducer 408 may control air pressure based on a linear, parabolic, exponential or other type of relationship between a received voltage/current and air pressure. In one embodiment, the transducer 408 may control air pressure based on a linear relationship between the received voltage (V) and pressure (P), wherein $P=3248.4V-16072$, although this is exemplary only. According to one embodiment, the transducer 408 may be configured to allow an input range of about zero (0) pounds per square inch ("psi") to one hundred thirty (130) psi of air pressure and/or an output range of about two (2) psi to one hundred (100) psi of air pressure. In other embodiments, the input and/or output range may be larger and/or smaller. The transducer 408 may also include internal solid-state feedback circuitry configured to provide precise control of air pressure output. In other embodiments, the internal solid-state feedback circuitry may be omitted.

In the illustrated system 400, the CPU 406 may be a digital component. In some cases, the pump 410 and/or transducer 408 may understand analog rather than digital signals, although this is merely one example, and in other embodiments, the CPU 406 may operate using electromagnetic signals, wireless signals, optical signals, acoustic signals, combinations thereof, or other suitable types of communications. In addition, in other embodiments, the pump 410 and/or transducer 408 may respond to electromagnetic signals, wireless signals, electric signals, optical signals, acoustic signals, combinations thereof, or other suitable types of communications. For example, in an embodiment, the CPU 406 may include a wireless transmitter configured to transmit wireless signals to a transport control system or a fluid transport control system including at least the pump 410. The pump 410 may be configured to receive and understand the wireless signals from the CPU 406. In one embodiment, the pump may include, for example, an integrated wireless receiver. In this embodiment, however, the CPU 406 communicates with the pump 410 and the transducer 408 with the aid of a digital to analog converter 407.

The digital to analog converter 407 is illustrated as being within the CPU 406, although this is merely exemplary. For instance, in practice, the CPU 406 may be separate from the digital to analog converter 407 and the CPU 406 may connect to the digital to analog converter 407 by using a bus or other communications link, and the digital to analog converter 410 may then pass a signal on to the pump 410 or the transducer 408. While one digital to analog converter 407 is shown, in other embodiments, the system 400 may include two, three, or any other suitable number of digital to analog converters.

In one embodiment, control of the pump 410 and transducer 408 may be independent. Thus, while a single communication line is illustrated as extending from the digital to analog converter 407, this is merely to avoid obscuring aspects of the figures. For instance, the digital to analog converter 407 may have two, three, sixteen, or any other suitable number of analog output channels, such that multiple analog signals can be output at a single time. Alternatively, multiple digital to analog converters may be used.

The digital to analog converter 407 may supply an analog signal (e.g., in the form of a voltage or current) directly to the pump 410 and/or transducer 408, and the pump 410 may then control fluid flow from the reservoir 402 based on the analog signal, or the transducer 408 may control flow of the air and/or other gases (e.g., argon, helium, and/or nitrogen) from the air source 404. In other embodiments, however, one or more intermediary components may be positioned between the digital to analog converter and the pump 410 and/or the transducer 408.

In FIG. 4, for instance, the digital to analog converter 407 may communicate directly with a signal filter 414 that then passes a signal towards the pump 410 and another signal towards the transducer 408. The signal filter 414 may provide any number of different features. For instance, the signal filter 414 may condition signals so that unwanted noise is removed from the signal. Additionally or alternatively, the signal filter 414 may shield inputs or outputs to prevent cross-talk or interference, provide resistor-capacitor filtering, open thermocouple detection, perform voltage attenuation, or provide any other suitable or desired feature. In one embodiment, the signal filter 414 may include a general breadboard area for custom circuitry and sockets for interchanging electrical components. In other embodiments, the system 400 may include two, three, or any other suitable number of signal filters. In other embodiments, the signal filter 414 may be omitted.

After the analog signals are passed through the signal filter 414, the illustrated embodiment shows that one communication line may then be directed to the transducer 408. The analog communication may, as noted above, be in the form of a voltage or current, such that as the voltage or current changes, the transducer 408 will modify the permitted air pressure flowing through the transducer 408. Air flow in this embodiment may also be affected by other factors. For instance, the air may be supplied by an air source 404 in the form of a compressor, a tank, a container, a vessel, or accumulator using a pneumatic line. The pneumatic line may connect to an air filter 418 that may substantially filter out impurities. As schematically illustrated, the air filter 418 may also include a drain through which impurities may be removed from the system 400. In an embodiment, the air filter 418 may also include a knob and a regulator to control and ensure that input to the transducer 408 is within a specified range and/or to protect the transducer 408 against sudden surges in pressure. A pneumatic line may also connect the air filter 418 to a pressure gauge 420. The pressure gauge 420 may display the pressure within the pneumatic line up to the transducer 408. In other embodiments, the pressure gauge 420 may be in communication with the CPU 406 and may provide pressure measurements within the pneumatic line to the CPU 406. As will be appreciated in view of the disclosure herein, the air filter 418 and/or pressure gauge 420 are merely optional. Additionally, while illustrated separately, the pressure gauge 420 may also be integral with the filter 418.

An analog signal sent from the signal filter 414 may also be directed towards the pump 410. In this embodiment, rather than sending the signal directly to the pump 410, the analog signal may be first received by a pump controller 416. The pump controller 416 may be separate from the pump 410 (as shown) or the pump controller 416 may be integral with the pump 410. The pump controller 416 may be used for any desired purpose. For instance, the pump 410 may require particular types of input signals, and the digital to analog converter 407 and/or signal filter 414 may be incapable of providing the necessary type of signal. In such a case, the pump controller 416 may take the input signal from the signal filter 414 and make the signal compatible with inputs to the pump 410.

Regardless of whether the optional pump controller 416 is needed or used, the pump 410 may ultimately receive an analog or other type of signal. Based on the signal, the pump 410 may respond by influencing fluid flow conditions from the reservoir 402. For instance, the pump 410 may control flow rate based on linear, parabolic, exponential or other relationship between a received voltage/current and a flow rate. In one example, the pump 410 may control flow rate based on a linear relationship between a received voltage (V) and the flow rate (Q), wherein $Q=47.292V-31.373$, although this is exemplary only.

As fluid flows from the reservoir 402 and through the pump 410, the fluid may be directed through one or more hydraulic lines and towards the nozzle 412 that may interface with a cutting machine 424. The cutting machine 424 may, for instance, be a CNC machining system. Inasmuch as the present embodiment may also include the air source 404 which supplies air that is also directed towards the nozzle 412 and the cutting machine 424, the air may also be allowed to mix with the fluid so as to provide an atomized spray directed at the cutting zone. In other embodiments, other gases may be allowed to mix with the fluid. For example, the air source 404 may provide air and/or other inert gases with the fluid so as to provide an atomized spray. To facilitate such a process, the system 400 of FIG. 4 includes an optional junction 422 configured to place the flow from the pump 410 and the flow from the transducer 408 in a substantially co-axial position that leads to the nozzle 412. In one embodiment, the junction 422 may be configured to receive air and/or other gases from the transducer 408 and pass the air and/or other gases through an interior chamber of the junction 422. The interior chamber of the junction 422 may be in communication with the nozzle 412 (e.g., directly or using a pneumatic line). Fluid from the pump 410 may also pass through the junction 422, such as through a hydraulic line extending within the interior chamber of the junction 422 in which the air flows. In one embodiment, as the hydraulic line approaches the nozzle 412, or even within the nozzle 412, the hydraulic line may allow the fluid to mix with the conveyed air. As a result, the air can atomize the fluid into droplets that are then carried by the air to form an atomized spray. The nozzle 412 may direct the droplets towards the cutting zone within the cutting machine 424. In other embodiments, the air flow may be stopped and a drip flow of lubricant and/or coolant may be directed from the nozzle 412 toward the cutting zone. In other embodiments, the flow of fluid may be stopped and the air flow may be directed from the nozzle 412 toward the cutting zone to blow out debris, remove heat, or remove excess fluid. The nozzle 412 may comprise a spray nozzle, a blow-off nozzle, a multi-channel nozzle, a precision nozzle, a flat nozzle, combinations thereof, or any other type of suitable nozzle. For example, the nozzle 412 may comprise a multi-channel nozzle having different flow channels in communication with the air flow and fluid flow in the junction 422. Such a configuration may allow the system 400 to direct the conveyed air and/or fluid toward the cutting zone simultaneously or intermittently in separate and/or combined flow streams.

In one embodiment, the amount of cutting fluid may be anywhere between about eight and about five hundred milliliters per hour, although this is exemplary only. For instance, in other embodiments, the pump 410 may deliver a greater or lesser maximum flow rate. By way of illustration, the pump 410 may have a maximum flow rate between about five and about one hundred twenty milliliters per hour. In still another embodiment, the pump 410 may deliver a flow rate between about ten and about fifty milliliters per hour. As will be appreciated, if multiple reservoirs are used in the system 400, there may be multiple co-axial tubes to produce droplets of multiple fluids, or to create composite droplets (e.g., coolant-on-lubricant or lubricant-on-coolant).

The system 400 may also include one or more input devices 426 that are used to obtain and/or return information to the CPU 406. For instance, in FIG. 4, an input device 426 is embodied within the cutting machine 424, although this is merely exemplary. In accordance with one aspect, the combination of air and fluid directed into the cutting machine 424 can lubricate and/or cool the cutting tool. As a result, the life of the cutting tool may be prolonged, and/or the cutting forces or surface characteristics may be affected. In some cases, one or more of these elements may be measured by the input device 426. For instance, the input device may include a measuring device, a sensor, an encoder, a dynamometer, or any other suitable type of input device. An exemplary dynamometer may include a charge amplifier that generates an analog voltage or other signal that is related to the cutting force within the cutting machine 424. This signal may be in an analog form, and can be conveyed back to the CPU 406. For instance, the CPU 406 may include, or be connected to, an analog to digital converter 428 that receives the analog signal from the input device 426 and converts the analog signal to a digital signal that the CPU 406 can understand. Using the received information, the CPU 406 may then output its own signal(s) to the pump 410 and/or transducer 408 to adjust the flow rate of a lubricant/coolant and/or the air pressure within the system 400.

In other embodiments, the input device 426 generally may be any number of other input devices. For instance, as discussed herein, the input device 426 may include a sensor or encoder that measures a flow within a hydraulic or pneumatic line in the system 400 and/or at a nozzle, so as to ensure that the desired pump 410 or transducer 408 output is being obtained. The input device 426 may also be a controller of the cutting machine 424 or other device that conveys cutting code, material information, cutting tool information, tool type information, cutting process information, cutting temperature, tool-chip friction, tool-work friction, work-piece geometry, environmental conditions, or any other information relating to the cutting process occurring or scheduled to occur within the cutting machine 424. In other embodiments, information may be provided to the CPU 406 via manual user input and/or automated input. For example, a user may manually input information into the CPU 406 regarding cutting tool information or environmental conditions such that the CPU 406 may dynamically control operation of the pump 410 and/or transducer 408 based on or in response to the user-input.

FIG. 5 illustrates a cutting fluid dispensing system 500 according to another embodiment of the present disclosure. It will be appreciated that the system 500 may be configured similar to the system 400 of FIG. 4 in various regards. Accordingly, the particular operation of exemplary and optional components within the system 500 may be determined by a review of system 400 presented above.

As with the system 400 illustrated in FIG. 4, the system 500 may include a processing component or CPU 506 that may use a digital to analog converter 507 to output signals, and an analog to digital converter 528 to receive signals. In general, the output signals may correspond to signals used by the CPU 506 to direct the operation or otherwise control other components within the system 500, while the input signals represent feedback or other information that the CPU 506 can use to determine in what manner air (or other gases) and/or fluid flow conditions should or could be altered.

The analog signals may pass through a signal filter 514. One signal may pass from the signal filter 514 and to a transducer 508, both forming part of a transport control system or an air transport control system that varies air flow conditions from an air supply system that may include an air source 504, filter 518, and pressure gauge 520. The air source 504 may be a compressor, accumulator, a pressurized tank, a container, a vessel, or any other suitable type of source of air and/or other gases (e.g., nitrogen, carbon dioxide, freon, and/or helium). Another signal may be directed to a first fluid transport control system that may include a pump controller 516 which passes the signal to a pump 510. In other embodiments, the pump controller 516 may be omitted. The pump 510 can pump fluid from a reservoir 502 at a rate generally corresponding to the signal received from the pump controller 516. Still another signal may pass from the signal filter 514 to second fluid transport control system including a pump controller 517 which communicates with a pump 511. The pump 511 may be used to move fluid from a second reservoir 503.

The fluid in the reservoirs 502, 503 may be the same, or may be different. Where different, the fluids may be different as to purpose, composition, any other manner, or in any combination of the foregoing. For instance, in one embodiment, a fluid in one of reservoirs 502, 503 is a lubricant while the fluid in the other of the reservoirs 502, 503 is a coolant. In another embodiment, both fluids are coolants or both are lubricants. In still other embodiments, more than two reservoirs may be included, and there can be multiple coolants, multiple lubricants, or any other combination of fluids usable by the system 500.

Fluids pumped by the pumps 510, 511 can each be passed through respective hydraulic lines and into a junction 522. The junction 522 may also receive air and/or other gases passing from the transducer 508. In one embodiment, for instance, the air passing from the transducer 508 may enter a hollow chamber within the junction 522. Optionally, one or more of the hydraulic lines from the pumps 510, 511 can also pass through the hollow chamber within the junction 522. Alternatively, the junction 522 may have separate, non-overlapping chambers for each liquid or gaseous fluid. In still other embodiments, the junction 522 may be eliminated and the hydraulic lines of the pumps 510, 511 and the pneumatic line from the transducer 508 can ultimately join in some other manner that allows the air to mix with the fluid(s) prior to or at the time the fluid is applied to a cutting zone of the cutting machine 524 (e.g., by mixing at the nozzle 512). In other embodiments, the system 500 may be configured such that the CPU 506 may control and/or adjust locations to which the nozzle 512 directs the one or more fluids within the cutting machine. In one embodiment, the nozzle 512 may dispense the one or more fluids to different locations using varying flow conditions and/or controlled movement of the nozzle 512. For example, the CPU 506 may instruct the pumps 510, 511, and/or the transducer 508 to vary flow rates such that the nozzle 512 may dispense a coolant and lubricant mixture from the pump 510 onto a race face of a cutting tool and a lubricant from the pump 511 onto a flank face of the cutting tool.

A particular aspect of some of the embodiments disclosed herein is that they may be produced and applied to a CNC or other machining system, even as an after-market product. That is to say that the system 300, the system 400, and/or the system 500 may be modular so as to allow implementation in both add-on/retrofit conditions, and as a part of new designs.

Figure 6:
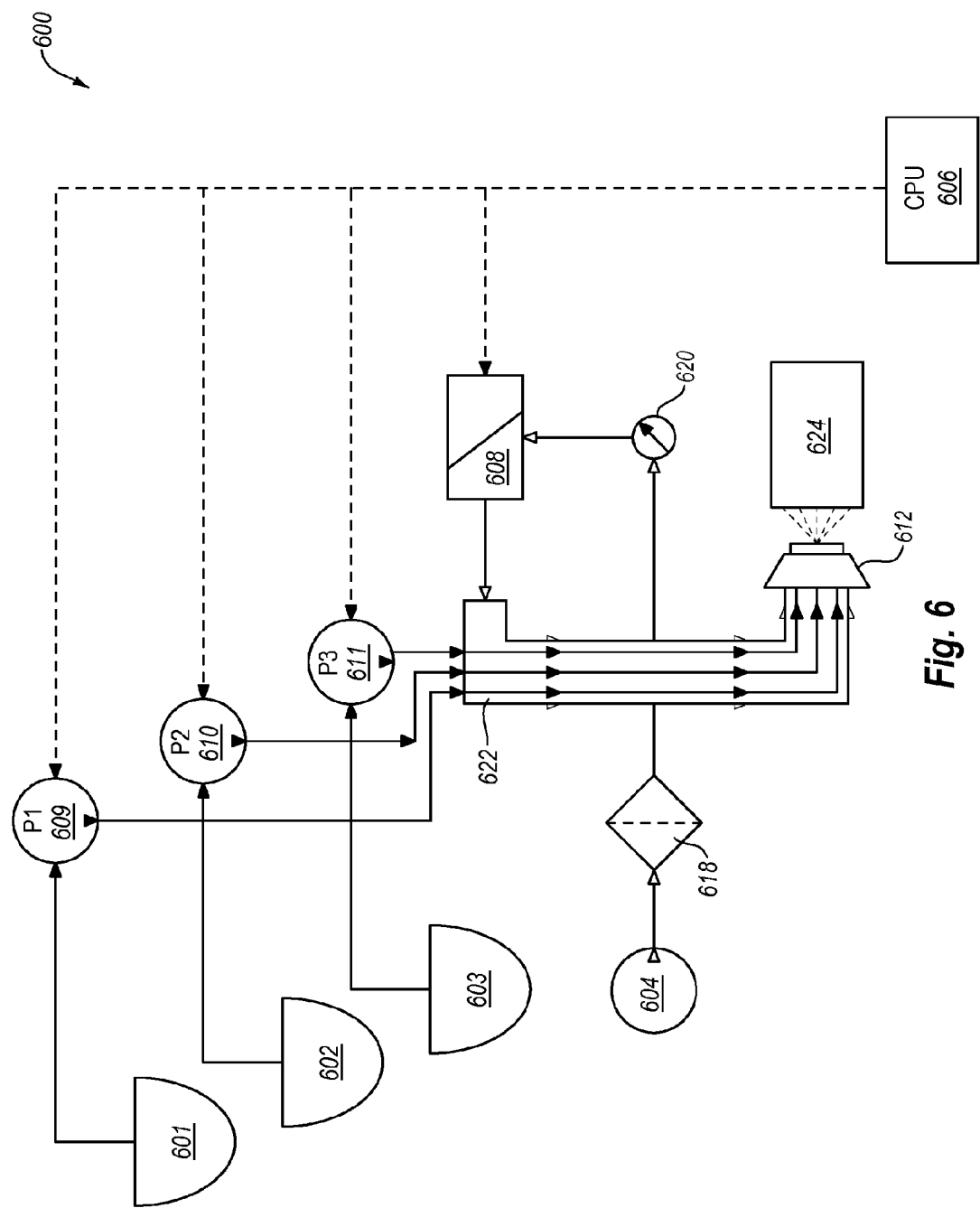
FIG. 6 schematically illustrates an exemplary cutting fluid dispensing system according to an exemplary embodiment of the present disclosure.

FIG. 6 illustrates a cutting fluid dispensing system 600 according to another embodiment of the present disclosure. It will be appreciated that the system 600 may be configured similar to the system 400 of FIG. 4 and/or the system 500 of FIG. 5 in various regards. Accordingly, the particular operation of exemplary and optional components within the system 600 may be determined by a review of system 400 and system 500 presented above.

The system 600 may include a CPU 606 that includes a wireless transceiver to output wireless signals and to receive wireless signals. In other embodiments, the CPU 606 may include a wireless transmitter and a wireless receiver. The wireless signals from the CPU 606 may include any type of suitable wireless signal such as radio frequency signals, acoustic energy signals, optical energy signals, or other suitable signals. In general, the output wireless signals may correspond to signals used by the CPU 606 to direct the operation or otherwise control other components within the system 600, while input wireless signals may represent feedback or other information that the CPU 606 may use to determine in what manner air or fluid flow should or could be altered. The wireless signals may be transmitted and/or received over large or short distances.

One wireless signal may transmit from the CPU 606 to an air transport control system that may include a transducer 608 (which may vary, for example, flow rate, velocity, and/or pressure of air and/or other gases), a compressor 604, a filter 618, and a pressure gauge 620. In other embodiments, the compressor 604 may be an accumulator, a container, a pressurized tank, a vessel, a cylinder, or other suitable source of air and/or other gases. In one embodiment, the transducer 608 may include a receiver that converts the wireless signal to a specific, desired air flow condition (e.g., pressure, flow rate, velocity). Another wireless signal may transmit from the CPU 606 to one or more fluid transport control systems that include at least a first pump 609, a second pump 610, or a third pump 611. The first pump 609 can pump fluid from a first reservoir 601 at a rate generally corresponding to the wireless signal received from the CPU 606. Another wireless signal may transmit from the CPU 606 to the second pump 610. The second pump 610 may be used to move fluid from a second reservoir 602. Still another wireless signal may transmit from the CPU 606 to the third pump 611. The third pump 611 may be used to move fluid from a third reservoir 603. The first pump 609, the second pump 610, and the third pump 611 may each be configured to receive one or more wireless signals from the CPU 606. As discussed above, the wireless signals may include instructions for modifying operation of the pumps. For example, each of the first pump 609, the second pump 610, and the third pump 611 may include a wireless receiver (not shown) that may communicate with the respective pump and/or a pump controller (not shown) of the respective pump, which carries out the instructions. In addition, the wireless receiver may perform other functions, such as signal filtering. For example, the wireless receiver may also include circuitry for determining whether the wireless signals are authentic, and transmit the instructions to the respective pump or pump controller only if they are determined to originate from the CPU 606. The wireless receiver may also determine that the respective pump cannot safely comply with the received instructions from the CPU 606 because of, for example, unsafe pumping conditions, and may decline to transmit the instructions to the respective pump or pump controller. Such a configuration may reduce the cost of operation of system 600 by reducing the need for extension wire, conduit, and other costly accessories.

The fluid in the first reservoir 601, the second reservoir 602, and the third reservoir 603 may be the same, or may be different. Where different, the fluids may be different as to purpose, composition, any other manner, or in any combination of the foregoing. For instance, in one embodiment, a fluid in the first reservoir 601 may be a lubricant while the fluid in the second reservoir 602 may be a coolant while the fluid in the third reservoir 603 may be a gel. In other embodiments, two of the fluids may be lubricants and the other fluid may be coolant. In still other embodiments, more than three reservoirs may be included, and there can be multiple coolants, multiple lubricants, or any other combination of fluids usable by the system 600.

Fluids pumped by the first pump 609, the second pump 610, and/or the third pump 611 may be passed through respective hydraulic lines and into a junction 622. The junction 622 may also receive air passing from the transducer 608. In one embodiment, the air passing from the transducer 608 may enter a hollow chamber within the junction 622. Optionally, one or more of the hydraulic lines from the first pump 609, the second pump 610, and/or the third pump 611 may also pass through the hollow chamber within the junction 622. In still other embodiments, the junction 622 may be eliminated and the hydraulic lines and a pneumatic line from the transducer 608 may ultimately join in some other manner that allows the air to mix with the fluid(s) prior to or at the time the fluid is applied to a cutting zone within a cutting machine 624 (e.g., mixing at a nozzle 612).

Figure 7:
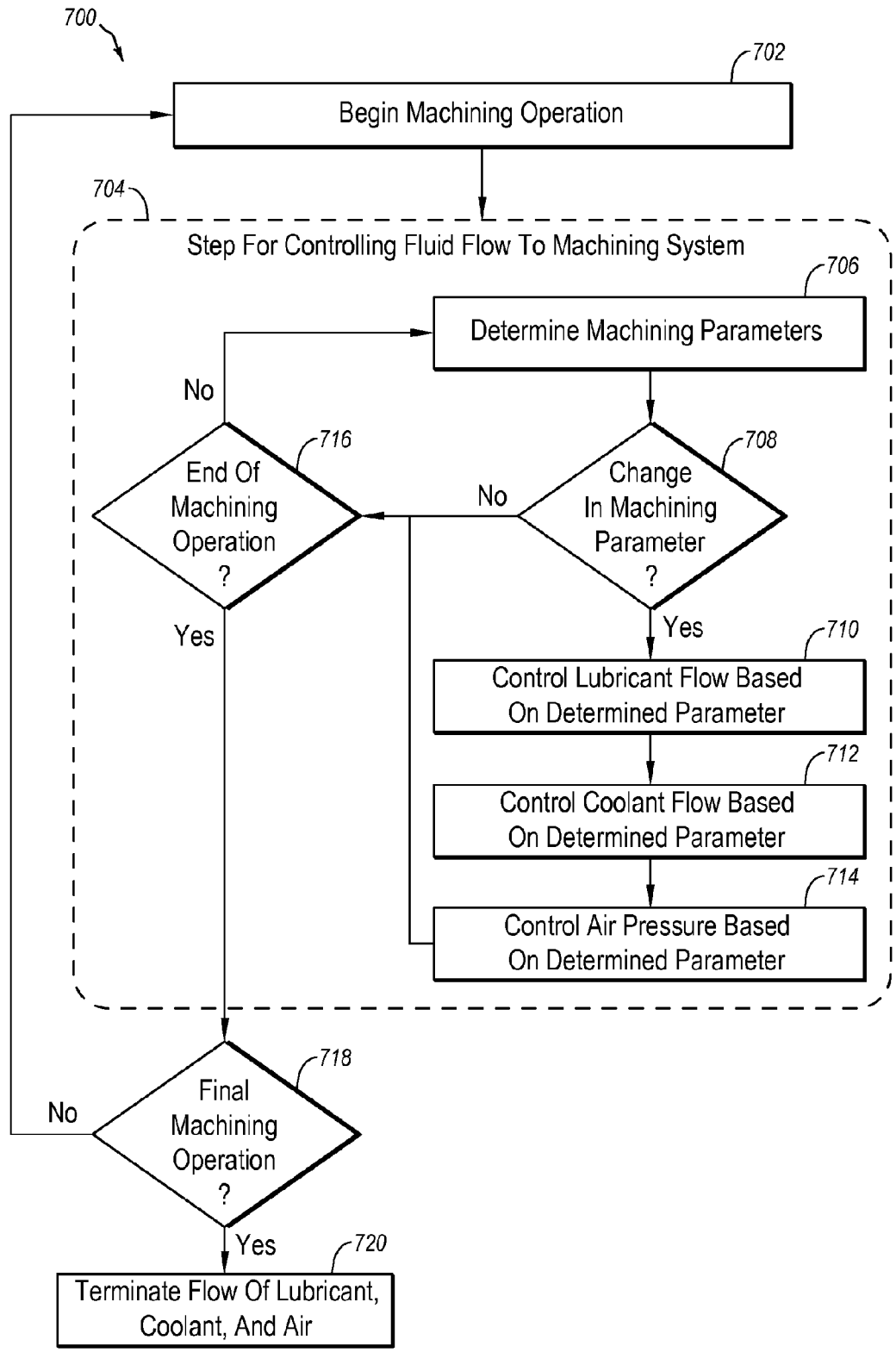
FIG. 7 is a flow chart of an exemplary method for machining an element and dynamically and independently controlling various fluid flow rates and pressures based on identified machining parameters.

FIG. 7 illustrates a flow chart generally describing one manner in which embodiments disclosed herein, or which may be learned from the disclosure herein, can be used to control devices and modulate fluids to adjust on the fly. In the illustrated method 700, a machining operation begins (act 702). A step may also be present for controlling fluid flow to a machining system (step 704). The step may be initiated in response to the machining operation beginning, may be initiated at the same time the machining operation begins, or may occur before the machining operation.

As part of the step 704, a determination may be made as to one or more machining parameters (act 706). For instance, the cutting force in a cutting machine may be determined. One such manner this may be determined is using a dynamometer and/or charge amplifier. Other parameters may include the temperature of the cutting tool, work piece, or other element within the cutting machine. Still other parameters include an identification of the tooling, cutting/machining process, work piece geometry, material, tool-chip friction, tool-work friction, or other aspect in use, or any combination of the foregoing. The parameters may be monitored continuously, on request, periodically, or in another suitable manner. When a parameter changes (act 708) (e.g., when an operation begins or a parameter within an operation changes), one or more of various outputs can be controlled. For instance, lubricant flow can be controlled based on the determined parameter (act 710). Likewise, coolant flow, lubricant flow, or air pressure can be controlled based on the determined parameter (acts 712, 714).

Determining how or to what extent the flow or pressure should be controlled may be done in any number of different ways. For instance, in the instance of a dynamometer that measures cutting force, an analog to digital converter may convert a received analog voltage signal to a digital signal that a processing component writes to a spreadsheet or quantifies as a direct value relating to cutting force. A protocol for the decision making on dispensing for air and/or fluids can then be used. For instance, a machining database may be queried to determine what levels of fluid or air are suitable based on the measured cutting force. The query may also use multiple inputs. A query might, by way of illustration, identify that the cutting force is a particular value, the machining operation is a "parting off," the material is a specified stainless steel alloy, and the part geometry is of a certain type. Any or all of these factors may influence the decision making, and a database, expert system, multi-dimensional analysis tool, artificial intelligence system, predictive model, or other component can factor any or all of this information into its decision. Based on the relevant factors, particular fluid and air flow rates can be determined and appropriate voltage signals can be sent to obtain the desired flow rates and pressures. In one example, an artificial intelligence system is embedded in a cutting fluid delivery system and creates a continuous learning protocol capable of constructing logic databases, such as for given material-tool combinations. Thereafter, when giving machining inputs that include parameters such as material, tool, and/or cutting operation, the logic database can be used to determine the amounts of fluid required to obtain suitable machining process outputs each time the same combination is used.

After controlling the desired one or more lubricant, coolant, or air flow rates, it may be determined whether a machining process (e.g., parting off, deep groove turning, thread forming, etc.) has ended (act 716). If the operation has not ended, the machining parameters may continue to be monitored or determined (act 706). Similarly, if there is no change in a machining parameter, the monitoring may continue. If, however, it is determined that an operation has ended, there may be one or more other machining operations that are to take place. For instance, there may be a switch in tooling or a switch to another type of process (e.g., switch from a drilling operation to a thread forming operation). If it is determined that there is another process such that the completed machining operation was not the final operation (act 718), the process may begin again when the machining operation begins (act 702). If the final operation is determined to have been completed (act 718), the process may end by, for instance, shutting down the flow of lubricant(s), coolant(s), and air and/or other gases (act 720).

As used herein, user of the term "transport control system" may refer to an air transport control system, a gas transport control system, and/or a fluid transport control system. Air transport control systems and/or gas transport control systems may include, for example, air sources, digital-to-analog converters, transducers, signal filters, sensors, valves, input devices, air filters, and/or pressure gauges. In addition, fluid transport control systems may include pumps, controllers, signal filters, input devices, sensors, valves, and/or digital-to-analog converters, while this is exemplary only. In other embodiments, the air transport control systems, the gas transport control systems, and/or the fluid transport control systems may include more or fewer components.

In accordance with one aspect, a minimal quantity cutting fluid (MQCF) dispensing system includes a fluid reservoir, a fluid transport control system hydraulically linked to the fluid reservoir, an air storage, and an air transport control system pneumatically linked to the air storage. A processing component is communicatively linked to the fluid transport control system and the air transport control system. The processing component is configured to control air pressure using the air transport control system and fluid flow using the fluid transport control system. Air pressure and fluid flow are independently controllable by the processing component. Air pressure and fluid flow are automatically and dynamically controllable by the processing component during a machining operation.

In accordance with an aspect that may be combined with any one or more other aspects herein, a fluid transport control system may include a pump.

In accordance with an aspect that may be combined with any one or more other aspects herein, a fluid transport control system is configured to vary a flow rate based on a change to voltage or current supplied to the fluid transport control system.

In accordance with an aspect that may be combined with any one or more other aspects herein, an air transport control system may be a valve.

In accordance with an aspect that may be combined with any one or more other aspects herein, a valve may be a transducer.

In accordance with an aspect that may be combined with any one or more other aspects herein, a transducer may be a voltage-to-pneumatic transducer.

In accordance with an aspect that may be combined with any one or more other aspects herein, an air container may be a compressor.

In accordance with an aspect that may be combined with any one or more other aspects herein, system may include a mechanism for combining a fluid flowing at a fluid flow with air provided at an air pressure.

In accordance with an aspect that may be combined with any one or more other aspects herein, a mechanism for combining one or more fluids may include a nozzle.

In accordance with an aspect that may be combined with any one or more other aspects herein, a mechanism for combining fluids may include a junction.

In accordance with an aspect that may be combined with any one or more other aspects herein, a junction may include an output at which air pressure and fluid flow are separate and generally coaxial.

In accordance with an aspect that may be combined with any one or more other aspects herein, a reservoir is a first reservoir and a fluid transport control system is a first fluid transport control system.

In accordance with an aspect that may be combined with any one or more other aspects herein, a system may include a second fluid reservoir and a second fluid transport control system hydraulically linked to the second fluid reservoir and communicatively linked to a processing component.

In accordance with an aspect that may be combined with any one or more other aspects herein, a second fluid transport control system may be controllable automatically by a processing component independent of a first fluid transport control system, such that respective flow rates controlled by first and second fluid transport control systems are automatically variable by the processing component in different degrees.

In accordance with an aspect that may be combined with any one or more other aspects herein, a processing component may include, or may be in communication with, a digital-to-analog converter, the digital-to-analog converter being configured to transform a first digital signal of the processing component into an analog voltage or current signal directed to a fluid transport control system and to transform a second digital signal of the processing component into an analog voltage or current signal directed to an air transport control system.

In accordance with an aspect that may be combined with any one or more other aspects herein, a system may include an input device communicatively linked to a processing component.

In accordance with an aspect that may be combined with any one or more other aspects herein, an input device determines physical values or characteristics represented within a cutting machine.

In accordance with an aspect that may be combined with any one or more other aspects herein, an input determines one or more of cutting force, cutting operation, tool in use, work piece geometry, or work piece material.

In accordance with an aspect that may be combined with any one or more other aspects herein, a processing component is configured to receive physical values or characteristics and, in response, automatically and dynamically change one or more of air pressure or fluid flow.

In accordance with an aspect that may be combined with any one or more other aspects herein, a CNC cutting machine is configured to receive at least one fluid and air at a tool tip or other location within the CNC cutting machine.

In accordance with an aspect that may be combined with any one or more other aspects herein, a fluid reservoir, fluid transport control system, air storage, air transport control system, and processing component may be modular components retrofitted to operate with a CNC cutting machine.

In accordance with an aspect that may be combined with any one or more other aspects herein, processing component may be at least partially integrated within one or more controllers or sensors of a CNC cutting machine.

In accordance with an aspect that may be combined with any one or more other aspects herein, a minimum quantity cutting fluid (MQCF) dispensing system may include a first fluid reservoir, a first pump hydraulically configured to retrieve a first fluid from the first fluid reservoir, a second fluid reservoir, a second pump hydraulically configured to retrieve a second fluid from the second fluid reservoir, and a processing component may be communicatively coupled to the first pump and second pump. The computing system may be configured to transmit a first signal to the first pump and a second signal to the second pump, wherein the first and second signals are dynamically and independently variable by the processing component.

In accordance with an aspect that may be combined with any one or more other aspects herein, a first fluid may be a cutting tool lubricant and a second fluid may be a cutting tool coolant.

In accordance with an aspect that may be combined with any one or more other aspects herein, a MQCF dispensing system may include more than two pumps connected to respective reservoirs for delivering more than two different fluids.

In accordance with an aspect that may be combined with any one or more other aspects herein, an air compressor may be pneumatically connected to a valve.

In accordance with an aspect that may be combined with any one or more other aspects herein, a processing component may be communicatively coupled to a valve and configured to transmit a third signal to a valve, wherein the third signal may be dynamically and independently changeable by the processing component and relative to first and second signals.

In accordance with an aspect that may be combined with any one or more other aspects herein, a first signal may control a flow rate of a first fluid to a dispensing nozzle, a second signal may control a flow rate of a second fluid to the dispensing nozzle, and a third signal may control an air pressure of air at the dispensing nozzle.

In accordance with an aspect that may be combined with any one or more other aspects herein, an air filter may be disposed between an air compressor and a valve.

In accordance with an aspect that may be combined with any one or more other aspects herein, a processing component may include a digital to analog converter configured to receive a digital input and produce first and second signals as analog signals.

In accordance with an aspect that may be combined with any one or more other aspects herein, a processing component may include a signal filter communicatively coupled to a digital to analog converter and configured to receive analog signals, the signal filter may be communicatively coupled to a valve and configured to transmit a second analog signal to the valve.

In accordance with an aspect that may be combined with any one or more other aspects herein, a processing component may include a controller interposing a signal filter and a first pump, the controller may be configured to receive a first analog signal and transform the first analog signal to be compatible with a first pump.

In accordance with an aspect that may be combined with any one or more other aspects herein, a system may include an input component configured to obtain information including measurable data relative to a work piece in production within a cutting machine or data regarding the tool or process performed by a cutting machine, where the input component may be configured to communicate obtained information to a processing component.

In accordance with an aspect that may be combined with any one or more other aspects herein, a processing component may be configured to automatically and without user intervention use obtained information and modify at least a first signal to thereby change a flow rate of a first fluid by a degree not equal to a degree by which flow rate of a second fluid is automatically changed.

In accordance with an aspect that may be combined with any one or more other aspects herein, a fluid delivery system may be used to initiate or provide a near-dry machining process.

In accordance with an aspect that may be combined with any one or more other aspects herein, a method for machining a work piece and dynamically and independently controlling multiple fluid flow rates and pressures based on identified machining parameters may include beginning a machining operation within a machining system and performing a step for controlling fluid flow to a cutting tool or machined workpiece of a machining system.

In accordance with an aspect that may be combined with any one or more other aspects herein, a method for machining a work piece and dynamically and independently controlling multiple fluid flow rates and pressures based on identified machining parameters may include beginning a machining operation within a CNC machining system, initiating a flow of at least two of a lubricant, coolant, or air through a fluid dispensing system directed at a cutting tool of a CNC machining system, evaluating a machining parameter of the machining operation, determining that the machining parameter has changed, and in response to determining that the machining parameter has changed, dynamically and without user intervention changing two or more of a lubricant flow rate, a coolant flow rate, or an air pressure.

In accordance with an aspect that may be combined with any one or more other aspects herein, at least two reservoirs may contain different liquids.

In accordance with an aspect that may be combined with any one or more other aspects herein, at least two pumps may each have an input hydraulically connected to a respective reservoir, and may have a hydraulic output. Each pump may be configured to change a flow rate at a respective hydraulic output in response to a received analog voltage signal.

In accordance with an aspect that may be combined with any one or more other aspects herein, a voltage-to-pneumatic transducer has a pneumatic input connected to an air compressor, includes a pneumatic output, and is configured to change an air pressure at the pneumatic output in response to a received analog voltage signal.

In accordance with an aspect that may be combined with any one or more other aspects herein, an air filter may include a combined drain and pressure gauge, and may interpose an air compressor and transducer.

In accordance with an aspect that may be combined with any one or more other aspects herein, a nozzle may receive hydraulic lines and a pneumatic line and may combine the same into a single flow directed at a cutting tool of a CNC machining system.

In accordance with an aspect that may be combined with any one or more other aspects herein, a control system may include a CPU configured to produce one or more digital signals.

In accordance with an aspect that may be combined with any one or more other aspects herein, a control system may include a digital-to-analog converter configured to receive one or more digital signals and transform the one or more digital signals into at least three analog voltage signals.

In accordance with an aspect that may be combined with any one or more other aspects herein, a control system may include a signal filter configured to receive at least three analog voltage signals and direct a first analog voltage signal to a transducer.

In accordance with an aspect that may be combined with any one or more other aspects herein, a control system may include at least two controllers each of which may be configured to receive an analog voltage signal and transform it into a signal understandable by a corresponding pump.

In accordance with an aspect that may be combined with any one or more other aspects herein, a control system may include a digital input configured to determine a value representative of a cutting force at a cutting tool and transmit the value to a CPU.

In accordance with an aspect that may be combined with any one or more other aspects herein, a control system may include an analog-to-digital converter configured to receive a cutting force value and/or power value and convert the value to a digital signal.

In accordance with an aspect that may be combined with any one or more other aspects herein, a control system and/or CPU may have logic accessible thereto to modify flow rates and air pressure automatically, without user intervention, and dynamically in response to a determined cutting force at a cutting tool.

The foregoing detailed description makes reference to specific exemplary embodiments. However, it will be appreciated that various modifications and changes can be made without departing from the scope contemplated herein and as set forth in the appended claims. For example, machining systems and components may have different combinations of types and configurations of pumps, valves, reservoirs, controllers, converters, fluids, and the like. Such differences described herein are provided primarily to illustrate that there exist a number of different manners in which fluid control systems may be used, made, and modified within the scope of this disclosure. Different features have also been combined in some embodiments to reduce the illustrations required, and are not intended to indicate that certain features are only compatible with other features. Thus, unless a feature is expressly indicated to be used only in connection with one or more other features, such features can be used interchangeably on any embodiment disclosed herein or modified in accordance with the scope of the present disclosure, unless by their nature the components are necessarily mutually exclusive. The detailed description and accompanying drawings are thus to be regarded as merely illustrative, rather than as restrictive, and all such modifications or changes, if any, are intended to fall within the scope of this disclosure.

More specifically, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive. Moreover, any steps recited in any method or process claims may be executed in any order and are not limited to the order presented in the claims, unless otherwise stated in the claims. Accordingly, the scope of the invention should be determined solely by the appended claims and their legal equivalents, rather than by the descriptions and examples given above.

What is claimed is:

1. A cutting fluid dispensing system, comprising:
    a fluid reservoir;
    a fluid transport control system hydraulically linked to said fluid reservoir, said fluid transport control system configured to retrieve a fluid from said fluid reservoir;
    an air source;
    an air transport control system pneumatically linked to said air source, said air transport control system configured to receive air from said air source; and
    a processing component communicatively linked to said fluid transport control system and said air transport control system, wherein said processing component is configured to dynamically control at least one of one or more air flow conditions using said air transport control system or one or more fluid flow conditions using said fluid transport control system during a machining operation.

2. The system of claim 1, further comprising:
    one or more input devices communicatively linked to said processing component, wherein said processing component is further configured to automatically and dynamically control at least one of said one or more air flow conditions or said one or more fluid flow conditions based on one or more of inputs received from said one or more input devices.

3. The system of claim 2, wherein said one or more inputs includes at least physical values or characteristics represented within a cutting machine during the machining operation.

4. The system of claim 1, wherein said one or more inputs includes at least one of a cutting force, a cutting operation, a tool in use, a work piece geometry, a work piece material, a cutting temperature, a tool-chip friction, or a tool-work friction.

5. The system of claim 1, wherein said processing component is preprogrammed or programmable to dynamically control at least one of one or more air flow conditions using said air transport control system or one or more fluid flow conditions using said fluid transport control system during a machining operation.

6. The system of claim 1, wherein said processing component is configured to dynamically control at least one of one or more air flow conditions using said air transport control system or one or more fluid flow conditions using said fluid transport control system during a machining operation based on or in response to at least one or more user inputs or one or more automated inputs.

7. The system of claim 1, wherein said one or more air flow conditions and said one or more fluid flow conditions are independently controllable by said processing component.

8. The system of claim 1, wherein said one or more air flow conditions and said one or more fluid flow conditions are automatically controllable by said processing component.

9. The system of claim 1, wherein said fluid transport control system is configured to vary said one or more fluid flow conditions based on a change to at least one of a voltage or a current directly or indirectly supplied to said fluid transport control system from said processing component.

10. The system of claim 1, wherein said processing component includes a digital-to-analog convertor, said analog converter being configured to transform a first digital signal of said processing component into a first analog voltage signal or a first current signal directed to said fluid transport control system and to transform a second digital signal of said processing component into a second analog voltage signal or a second current signal directed to said air transport control system.

11. The system of claim 1, wherein said fluid transport control system includes a pump comprising at least one of a positive displacement pump, a variable displacement pump, a micropump, a fluid mixing pump, a venturi system, or a metering pump.

12. The system of claim 1, wherein said air transport control system includes a transducer configured to control air pressure allowed to pass through said transducer in response to one or more signals indirectly or directly received from said processing component.

13. The system of claim 12, wherein said transducer is a voltage-to-pneumatic transducer, and wherein said air source is at least one of a compressor, a tank, a cylinder, or a container.

14. The system of claim 1, further comprising a mixing system including a nozzle configured to combine at least said fluid and said air.

15. The system of claim 14, wherein said mixing system is further configured to produce an atomized spray.

16. The system of claim 14, wherein said mixing system further includes a junction having an output at which air flow of said air and fluid flow of said fluid are separate and generally coaxial.

17. The system of claim 1, wherein said fluid reservoir is a first fluid reservoir, said fluid is a first fluid and said fluid transport control system is a first fluid transport control system, the system further comprising:
    a second fluid reservoir; and
    a second fluid transport control system hydraulically linked to said second fluid reservoir, said second fluid transport control system configured to retrieve a second fluid from said second fluid reservoir, said fluid transport control system being communicatively linked to said processing component, wherein said second fluid transport control system is controllable by said processing component independent of said first fluid transport control system.

18. The system of claim 17, wherein said processing component is further configured to dynamically control said first fluid transport control system and said second fluid transport control system such that said first fluid and said second fluid are deliverable to a cutting machine at different locations.

19. The system of claim 17, wherein said second fluid is different from said first fluid.

20. The system of claim 1, wherein said air comprises at least one of nitrogen, helium, argon, carbon dioxide, or freon.

21. The system of claim 1, further comprising a computer numerical control (CNC) machine configured to receive said fluid and said air at a tool tip of said CNC cutting machine or at a machined work surface.

22. The system of claim 21, wherein said processing component is integrated within one or more controllers or sensors of said CNC cutting machine.

23. The system of claim 21, wherein said fluid reservoir, said fluid transport control system, said air source, said air transport control system, and said processing component are modular components configured to operate with said CNC cutting machine.

24. A minimum quantity cutting fluid (MQCF) dispensing system, comprising:
a first fluid reservoir;
a first pump hydraulically configured to retrieve a first fluid from said first fluid reservoir;
a second fluid reservoir;
a second pump hydraulically configured to retrieve a second fluid from said second fluid reservoir;
a processing component communicatively coupled to said first pump and said second pump, wherein said processing component is configured to transmit a first signal to said first pump and a second signal to said second pump, wherein said first and second signals are dynamically and independently changeable by said processing component.

25. The system of claim 24, further comprising:
an air compressor;
a valve pneumatically configured to receive air from said air compressor, wherein said processing component is communicatively coupled to said valve and configured to transmit a third signal to said valve, wherein said third signal is dynamically and independently changeable, relative to said first and second signals, by said processing component, and
one or more input devices configured to obtain information including measurable data relative to a work piece in production within a cutting machine or data regarding a tool or process performed by said cutting machine, wherein said one or more input devices are configured to communicate said obtained information to said processing component.

26. The system of claim 24, wherein said processing component is configured to automatically and without user intervention use said obtained information and modify at least said first signal to thereby change a flow rate of said first fluid by a degree not equal to an automatic change to a flow rate of said second fluid.

27. The system of claim 25, further comprising:
a nozzle positioned and configured to receive said first fluid, said second fluid, and said air, wherein said first signal controls a flow rate of said first fluid to said nozzle, and wherein said second signal controls a flow rate to said second fluid to said nozzle, and wherein said third signal controls an air pressure to said air at said nozzle.

28. A minimum quantity cutting fluid (MQCF) dispensing system, comprising:
at least two reservoirs containing different liquids;
at least two pumps, each of said at least two pumps having an input that is hydraulically connected to a respective one of said at least two reservoirs, wherein each of said at least two pumps include a hydraulic output, and wherein each of said at least two pumps is configured to change a flow rate at said respective hydraulic output in response to a received analog voltage signal;
an air compressor;
a voltage-to-pneumatic transducer having an input pneumatically connected to said at least one air compressor, said voltage-to-pneumatic transducer further including a pneumatic output and said voltage-to-pneumatic transducer being configured to change an air pressure at said pneumatic output in response to a received analog voltage signal;
a combined air filter, drain, and pressure gauge interposing said air compressor and said voltage-to-pneumatic transducer;
a junction linked to each of said hydraulic outputs of said at least two pumps and to said pneumatic output of said voltage-to-pneumatic transducer, wherein said junction includes an output configured to place hydraulic lines corresponding to said hydraulic outputs coaxial to, and within, a pneumatic line corresponding to said pneumatic output;
a nozzle configured to receive said hydraulic lines and said pneumatic line and combine the same into a single flow directed at a cutting tool of a CNC machining system;
a control system that includes:
a CPU configured to produce one or more digital signals;
a digital-to-analog converter configured to receive said one or more digital signals and transform said one or more digital signals into at least three analog voltage signals;
a signal filter configured to receive said at least three analog voltage signals and direct a first analog voltage signal to said voltage-to-pneumatic transducer;
at least two controllers, each of said first two controllers configured to receive one of said at least three analog voltage signals, other than said first analog voltage signal, and transform said received at least one voltage signal into a signal understandable by a corresponding one of said at least two pumps;
a digital input configured to determine a value representative of a cutting force at said cutting tool and transmit said value to said CPU; and
an analog-to-digital converter configured to receive said value and convert said value to a digital signal,
wherein said CPU includes logic stored therein, or accessible thereto, that includes instructions on how to modify each of said flow rates and said air pressure automatically, without user intervention, and dynamically in response to said cutting force at said cutting tool.

29. A method for machining a work piece, the method comprising:
beginning a machining operation within a CNC machining system;
initiating a flow of at least two of a lubricant, coolant, or air through a transport control system directed at a cutting tool of said CNC machining system;
evaluating a machining parameter of said machining operation;
determining that said machining parameter has changed; and
in response to determining that said machining parameter has changed, dynamically and without user intervention changing two or more of:
a lubricant flow rate;
a coolant flow rate; or
an air pressure.

* * * * *